Oct. 7, 1958    J. M. HOOD    2,854,848
UNIVERSAL METER HEAD AND CONVERSION APPARATUS FOR METERS
Filed Dec. 4, 1953    4 Sheets-Sheet 1
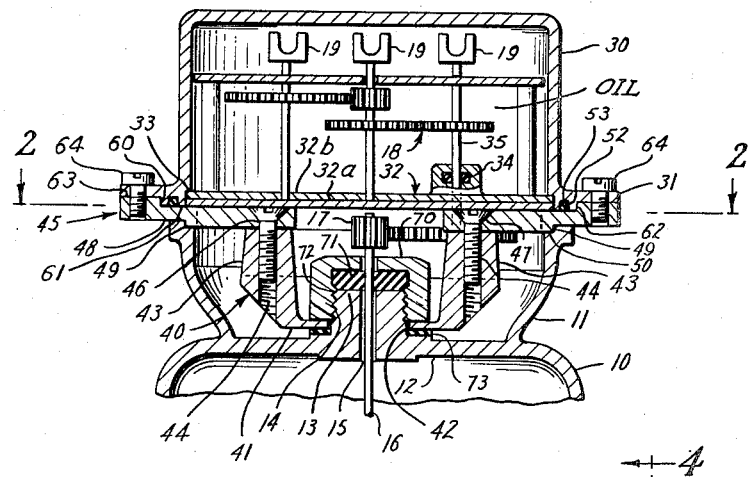
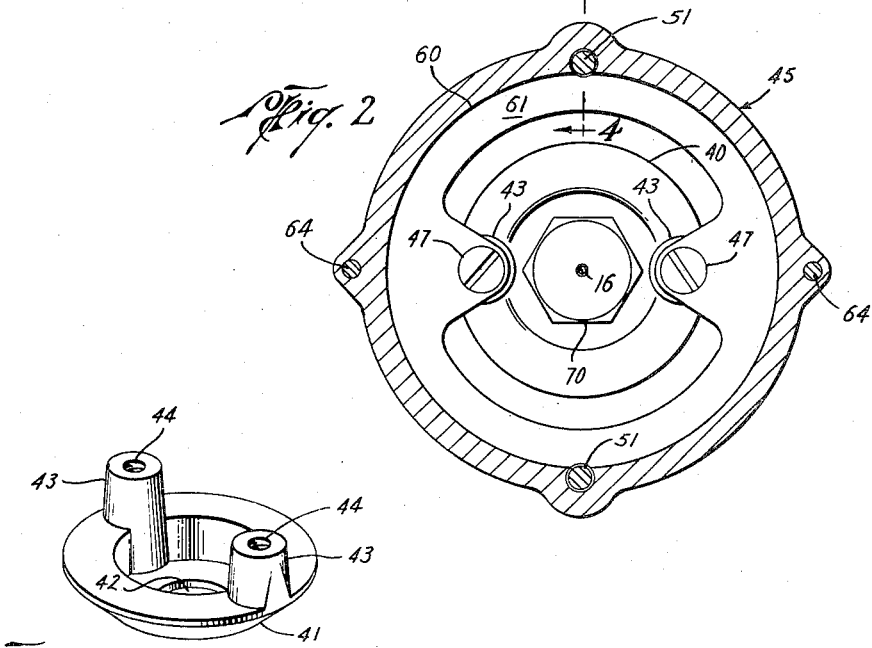
James M. Hood
INVENTOR.
BY Browning, Simmons & Hyer
ATTORNEYS

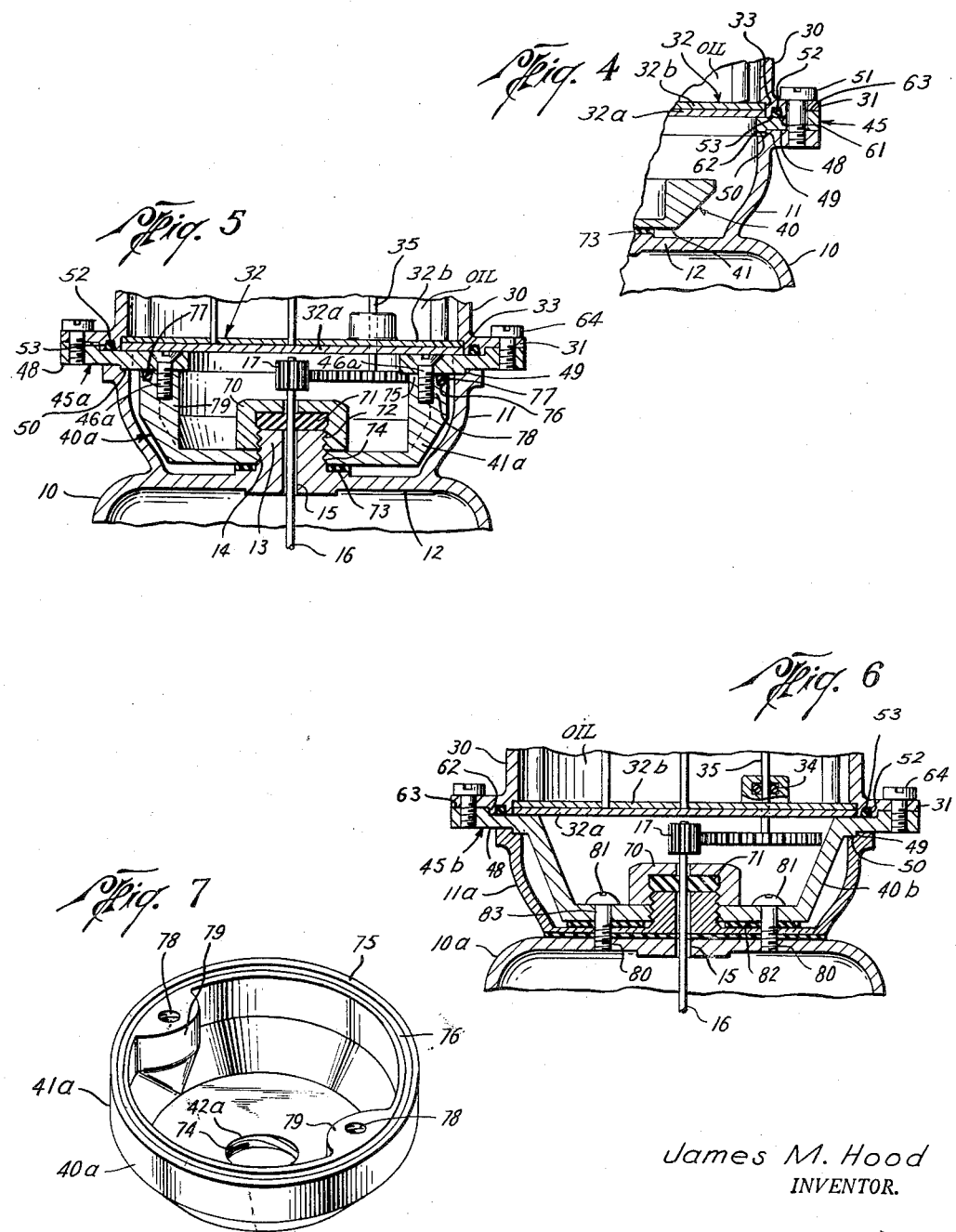

Oct. 7, 1958
J. M. HOOD
2,854,848
UNIVERSAL METER HEAD AND CONVERSION APPARATUS FOR METERS
Filed Dec. 4, 1953
4 Sheets-Sheet 3
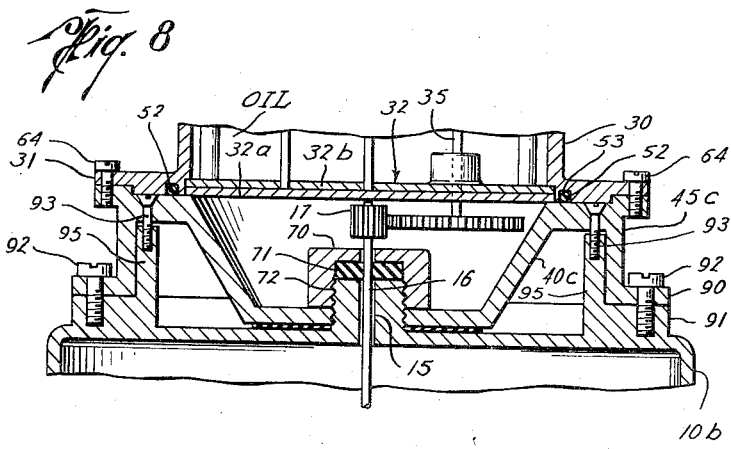
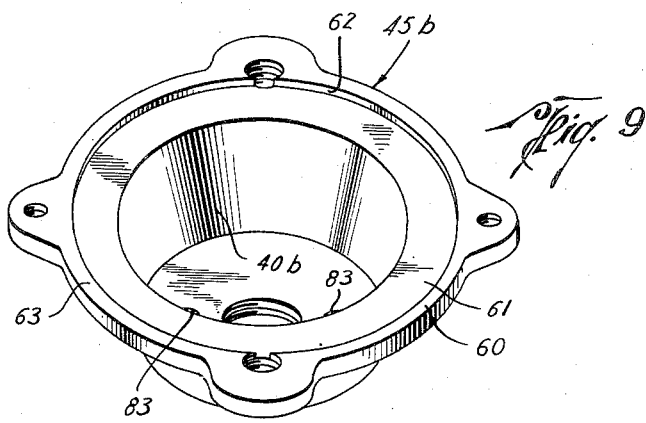
James M. Hood
INVENTOR.
BY Browning, Simms & Hyer
ATTORNEYS Oct. 7, 1958 J. M. HOOD 2,854,848
UNIVERSAL METER HEAD AND CONVERSION APPARATUS FOR METERS
Filed Dec. 4, 1953 4 Sheets-Sheet 4

James M. Hood
INVENTOR.

BY Browning, Simms & Hyer

ATTORNEYS

United States Patent Office 2,854,848
Patented Oct. 7, 1958

2,854,848

UNIVERSAL METER HEAD AND CONVERSION APPARATUS FOR METERS

James M. Hood, San Antonio, Tex.

Application December 4, 1953, Serial No. 396,300

7 Claims. (Cl. 73—273)

This invention relates generally to conversion apparatus for commercial meters used to measure fluid flow and more particularly to apparatus including an adapter for converting a water meter, having a conventional head, to receive a universal meter head.

This universal meter head may be of the type disclosed in the copending applications by the same inventor, entitled Recording and Indicating Apparatus, Serial No. 286,109, filed May 5, 1952, and Meter and Apparatus for Reading Same, Serial No. 271,391, filed February 13, 1952 now abandoned and substituted by Serial No. 424,872, filed April 20, 1954, the latter now being issued as Patent 2,757,364, issued July 31, 1956, or it may be of any other type which has the characteristic of being able to withstand pressures. Briefly the meter head disclosed in the above mentioned applications is cup-shaped and has an annular flange with means for securing the head both to the meter body and to the adapter. The outstanding feature of the meter head in addition to its being able to withstand pressures is its construction, preferably all-metal, which avoids the use of the conventional glass window for dial reading purposes. This construction of the meter head is made possible by means including magnets disposed on one side of a metal plate in the meter head, the magnets being rotated by the meter, and by an indicating apparatus including magnets on the other side of the metal plate which are driven by said rotated magnets, as is set forth in detail in the above-mentioned copending applications.

It is contemplated that a large number of the millions of water meters in use both in the United States and abroad will be converted for use with these universal meter heads. Among these millions of water meters in current use there are as many as fourteen different styles, many of which styles have meter bodies requiring meter heads different from those required by other styles. Thus, a substantial demand is anticipated for conversion apparatus, of the type herein disclosed, which makes possible the conversion of most of the different styles of conventional meters to receive the universal meter heads.

Most of these millions of water meters in current use have as a common feature that one or more drainage holes are provided in the upper bowl of each meter for the purpose of draining water from the upper bowl. In spite of the stuffing box or other packing means which is usually provided around the meter drive shaft, as a practical matter, enough leakage often occurs to fill up the upper bowl. If the leakage water is not drained, as by the drainage holes mentioned above, considerable pressure may build up over a period of time in the upper bowl and this pressure may be over 150 p. s. i. in some cities. When such pressure builds up, it often causes rupture of the glass window usually provided in conventional meters, because the glass window is not normally constructed of sufficient strength to withstand the pressure. Also, the leakage water, if not drained from the upper bowl, may eventually completely cover the shafts and gears in the meter and cause rust or corrosion of these moving parts. It is also true that in many styles of conventional meters the walls of the upper bowl are not normally built to withstand the building up of pressure against them. For these reasons, drainage holes are usually provided in the upper bowl.

However, the presence of these drainage holes leads to several undesirable problems. The drainage of water helps create damp and stagnant areas around the meter site. One problem is that such areas often become breeding grounds for disease carrying insects. Another problem is that such areas attract snakes, often of the poisonous variety, which endanger the lives of meter readers. A further problem is that whatever water drains from the holes is wasted water. Another problem is that ants and other insects often creep into the meter through the open drainage holes, sometimes carrying foreign matter with them, and thus promote fouling of the meter parts.

Furthermore, the drainage holes sometimes become stopped up, due to the gradual accumulation of dirt, foreign matter brought in by insects, and other refuse in them, and no longer permit the draining of the upper bowl. And when the drainage holes are stopped up, the problems which the holes were designed to avoid again crop up.

It is therefore an important object of this invention to provide apparatus which has the dual function of converting any of several different styles of conventional meters to receive a universal meter head and of eliminating the necessity of providing drainage holes in the upper bowl of the meter body.

Another object of this invention is to provide apparatus for converting any of several styles of conventional meters to receive a universal meter head.

Another object of this invention is to provide such conversion apparatus which substantially overcomes all of the problems enumerated above.

Another object is to provide apparatus for converting conventional meters to receive a universal meter head, the apparatus serving the further purpose of anchoring the meter head to the body of the meter thus enabling the meter head to withstand the pressures which may build up in the upper bowl and thus eliminating the necessity of providing drainage holes in the upper bowl.

Another object is to provide a conversion unit which may be supplied as a complete unit to convert conventional meters to the type capable of withstanding pressures.

Another object of the invention is to provide conversion apparatus for use with a conventional meter having an upper bowl with walls too weak to withstand pressure which apparatus effectively prevents the building up of pressure against the walls of the upper bowl of the meter.

It is further contemplated that oil or grease be used as an immersion bath for the moving elements, such as gears, shafts and magnets, in the meter head. In the event that water leakage builds up a pressure in the adapter bowl of this invention, some water may leak into the meter head, yet the oil bath will float on the water and still lubricate the moving elements and protect them from the rust or corrosion which would otherwise result from contact with the water over a period of time.

It is another object of the invention to provide conversion apparatus for conventional meters which apparatus prevents drainage of water from the meter and thereby saves water and reduces the likelihood of dampness and stagnation in the area surrounding the meter due to this cause.

Another object is to provide conversion apparatus including an adapter bowl which together with the meter head forms a chamber hermetically sealed from the upper bowl of the meter, whereby the force acting to separate the adapter bowl from the meter body is kept at a minimum.

These and other objects will become aparent upon perusal of the following specification and claims.

In the drawings:

Fig. 1 is a sectional view of a portion of one conventional water meter showing one embodiment of the conversion apparatus of this invention;

Fig. 2 is a view taken along lines 2—2 of Fig. 1;

Fig. 3 is a perspective view of a portion of the adapter body of Figs. 1 and 2;

Fig. 4 is a fragmentary sectional view taken along lines 4—4 of Fig. 2;

Fig. 5 is a fragmentary sectional view of the same style meter as shown in Fig. 1 but showing another embodiment of the adapter body;

Fig. 6 is a fragmentary sectional view of a different style meter from that shown in Figs. 1–5 and shows an integral adapter bowl and annulus for converting the different style meter;

Fig. 7 is a perspective view of the adapter bowl of Fig. 5;

Fig. 8 is a fragmentary sectional view of still another type of conventional water meter embodying another form of adapter body of this invention;

Fig. 9 is a perspective view of the integral adapter bowl and annulus of Fig. 6.

Fig. 10 shows the preferred embodiment illustrating this invention.

Figure 10:
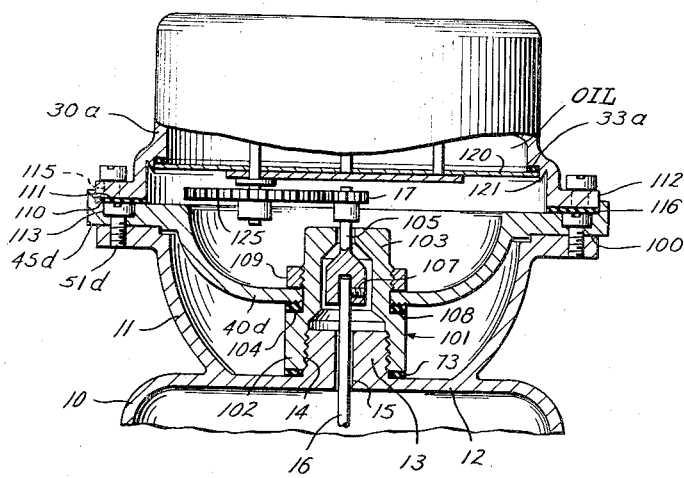
Fig. 10 is a fragmentary sectional view of a meter of the type shown in Figs. 1, 4 and 5, but showing a different form of meter head and another embodiment of adapter bowl and their attachment to the meter body.

Referring more particularly to the drawings, Figs. 1–5 show in part a conventional water meter of a type widely used having a body 10 and an upper bowl 11 separated by a wall 12. The body 10 is normally exposed to the water pressure of the line being metered while upper bowl 11 is not normally subject to such pressure. A central boss or projection 13 extends upwardly from the meter body 10, has external threads 14 formed thereon, and includes a bore 15 housing the meter drive shaft 16. The drive shaft 16 has a pinion 17 thereon which, when employed with a universal head previously mentioned, acts through a gearing system indicated generally at 18, to rotate the magnets 19 which replace the usual pointers mounted on the indicating shafts of the meter head. These magnets cooperate with magnets in a meter reading device, such as shown in Patent No. 2,757,364, which fits over the meter head 30 and contains conventional dials and pointers for indicating the meter reading.

The magnets 19 and part of the gearing system 18 are housed in an oil-filled meter head 30 which is cup-shaped and has an outwardly extending annular flange 31. Head 30 is made of a non-magnetic metal. This meter head is herein referred to as a universal meter head as it is desired to convert any of the conventional meters to receive this universal meter head or a similar meter head by means of the conversion apparatus of this invention. A partition or wall 32, preferably of metal, covers the mouth of the cup-shaped head 30. This wall 32 serves the dual function of journaling the shafts of the gearing system 18 and sealing the meter head from the upper bowl 11. The universal meter head 30 may be filled with oil and transported as a unit to the site of the meter to be converted thus facilitating fast installation. The wall 32 may be formed of two plates, the lower plate 32a serving as a sealing member and the upper plate 32b serving as a journaling member. While the wall 32 is shown as formed of two plates, it can also be made of a single plate having the shafts of the gearing system 18 journaled therein. Sealing means may then be provided around the shafts. The wall 32 may be press-fitted within a recess 33 in the meter head 30 or may be otherwise removably mounted over the mouth of the head. An O-ring 34, or other sealing means, surrounds the shaft 35 of the gearing system 18, the only shaft which necessarily passes through the wall 32.

One embodiment of the conversion apparatus of this invention is shown in Figs. 1–4 and includes an adapter body 40 made up of a bottom part 41, with an opening 42 therein, and an upper part formed as an annulus 45. Bosses 43 extend upwardly from the bottom 41 and have internally threaded bores 44 therein. The annulus 45 has bores 46 corresponding to the bores 44 to receive means such as capscrews 47 for securing it to the adapter bottom. The annulus 45 has a face formed to mate with a part on the meter bowl 11. This face includes an annular seating surface 48, an annular shoulder 49 and an adjacent seating surface 50, and seats in mating relation on the upper bowl 11 of the meter body 10.

Means for securing the adapter body 40 to the meter bowl 11 are provided and may be in the form of capscrews such as 51 (see Fig. 4). It will be noted that in this embodiment the capscrew 51 extends through the flange 31 of the meter head as well as through the annulus 45 of the adapter body securing both members to the upper bowl 11 and thereby to the meter body 10. Sealing means are provided between the annulus and the meter head in the form of an O-ring 52 inserted in an annular groove 53 in the meter head.

The annulus 45 of the adapter body has another face, opposed to that mating with the upper bowl, formed to mate with the meter head 30. This other face includes an annular recess 60 providing a seating surface 61 and an annular shoulder 62 adjacent another surface 63, and cooperates with securing means, such as capscrews 64, for securing the adapter body to the meter head 30.

Packing means are provided in most conventional meters around the drive shaft 16 to limit leakage from the meter body into the upper bowl 11. These packing means may include a cup-shaped gland nut 70 surrounding the drive shaft 16 and filled with any popular type of shaft packing material 71, the internal threads 72 of the nut 70 engaging the external threads 14 of the central boss 13 of the meter body 10.

It will be observed that the securing means, such as capscrews 51, for securing the meter head 30 to the meter body 10 includes the upper bowl 11 on the meter body. This invention provides additional securing means, independent of the upper bowl, for securing the meter head to the meter body. One form of this additional securing means may include the area of the bottom adapter portion 41 adjacent the opening 42, which area may be securely clamped to the meter body 10 by the packing nut 70. It will be obvious to those skilled in the art that other forms of such additional securing means may be used, the important feature being that the meter head 30 be held to the meter body 10 against pressures by means independent of the upper bowl. A cushioning means in the form of a gasket 73 is provided between the adapter body 40 and the meter body 10.

Figs. 5 and 7 show an adapter body 40a including a bowl 41a which, when secured to the meter body 10, forms a chamber within the upper bowl 11. In this form the gasket 73 serves not only as a cushion but also as a hermetical sealing means for sealing the adapter bowl 41a to the meter body 10. This form of adapter body then effectively prevents the building up of pressures against the walls of the upper bowl 11 in meters wherein the walls are too weak to withstand such pressures, and fulfills one of the objects of the invention set forth above.

It will be observed that the adapter body 40a may be formed with internal threads 74 in the opening 42a in its bowl 41a, thus permitting it to be screwed onto the boss 13, thereby securely anchoring the adapter and the meter head to the meter body 10 independently of the nut 70. The bowl 41a has an annular upper edge 75 with a groove 76 formed therein to receive an O-ring 77 for sealing it to the under surface of the annulus 45a. It is held tightly against the annulus 45a by means of screws 46a engaged in threaded holes 78 in bosses 79 formed inside of and integral with bowl 41a. The annulus 45a is substantially similar to the annulus 45 of Figs. 1–4 and has its upper and lower surfaces similarly formed and secured to the meter head and bowl respectively.

Still another embodiment of the invention is shown in Figs. 6 and 9 wherein the adapter body 40b may be formed as a casting integral with its annulus 45b. The integral adapter body as shown in Figs. 6, 8, 9, 10 and 11 is preferred because it is simpler and cheaper to make and easier to install on a meter to be converted. It will be observed also that Fig. 6 shows a slightly different type of meter body, which, like that of Fig. 1, is in wide use commercially. In this type of meter the upper bowl 11a is not integral with but separate from the meter body 10a and threaded bores 80 are present in the meter body 10a and holes 83 are in the body 40b to receive screws 81 which serve to secure the upper bowl to the meter body and, in this invention, also serve as additional means for securing the adapter body 40b and the meter head 30 to the meter body 10a. A gasket 82 provides a sealing means to prevent escape from the adapter body into the upper bowl 11a of any leakage water that seeps through the packing means around the shaft 16, thereby preventing pressure from building up against the upper bowl walls. Except for the modification necessary to make it integral with bowl 40b, the flange 45b is substantially similar to flange 45 of Figs. 1–4.

Fig. 8 shows a portion of still another type of water meter in wide use today and the form of the adapter suitable for converting it to receive the universal meter head. The adapter body 40c has an integral annulus 45c including a depending cylindrical portion which takes the place of the usual upper bowl found in this type of meter. The cylindrical portion has outwardly extending ears 90 and has a face formed to mate with corresponding parts 91 of the meter body 10b. Capscrews 92 are provided as means for securing the adapter body 40c and the meter head 30 to the meter body 10b. This means may also include capscrews 93 inserted through bores in the adapter body 40c for cooperation with threaded bores in the plurality of separate upstanding projections 95 which are rigid with the meter body. Capscrews 64 again serve as means for securing the meter head 30 to the adapter body 40c. Although the capscrews 64, 92 and 93 are shown positioned substantially in the same axial plane, it will be understood that the bores may be positioned so that these capscrews will be spaced at intervals around the periphery of the adapter body as desired.

Figure 11:
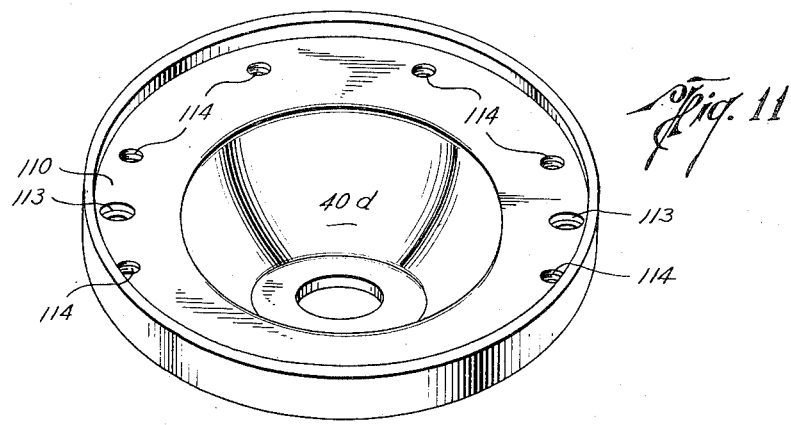
Fig. 11 is a perspective view of the adapter bowl of Fig. 10.

The preferred embodiment of this invention is illustrated in Figs. 10 and 11. In this embodiment the meter body 10 and upper bowl 11 are the same as described in connection with Figs. 1 and 5. However, it will be observed that the adapter bowl 40d of this embodiment is considerably shallower than those previously described. This shallow bowl 40d has proven desirable in practice for the reason that with it more of the different styles of meters in use today can be converted. Thus the distance between the wall 12 and the face 100 of the upper bowl 11 varies in different styles of meters. In order to manufacture one standard adapter bowl which can be used to convert most of these different styles, the shallow bowl 40d may be used together with an adapter nut 101.

This adapter nut 101 has an internally threaded portion 102 cooperating with threads 14 on the meter body projection 13, and an externally threaded portion 103, the portion 103 being of smaller diameter to provide a shoulder 104 to receive the adapter bowl 40d. The distance of this shoulder 104 from the opposite end of the portion 102 may be easily increased or decreased in manufacture to thus compensate for the different sizes of upper bowls which may be encountered in different styles of meters. The adapter nut 101 is bored internally to accommodate the meter drive shaft 16 and a drive shaft extension 105 which projects above the portion 103 to carry the pinion 17. This extension 105 has a sleeve portion which may be secured to the drive shaft 16 by a set screw 107. Sealing and cushioning means in the form of an oversized or extra thick sealing ring 108 is provided between the shoulder 104 and the adapter bowl 40d, and a nut 109 serves as means to securely anchor the adapter to the nut 101 and thereby to the meter body 10. This sealing means is made extra thick so that small variations in the dimension between the upper bowl face 100 and the shoulder 104 on the adapter nut may be compensated for by positioning of the nut 109, while still maintaining the seal.

The adapter bowl 40d has an integral annulus 45d provided with a face 110 mating with a corresponding face 111 on the flange 112 of the meter head 30a. Counterbores 113 are provided in the annulus 45d to receive capscrews 51d serving as means to secure the adapter to the upper bowl 11. The annulus face 110 has a plurality of threaded bores 114 corresponding to the bores 115 in the flange 112 to receive capscrews providing means to securely fasten the meter head to the adapter and also to ensure a proper seal by the sealing means such as a gasket 116 which is provided between the meter head and the adapter.

It will be observed that the meter head 30a is provided with an annular shoulder 33a which is spaced a considerable distance from the face 111 of the flange 112. This shoulder 33a provides a seat for the wall 120 which may be formed in a similar manner to wall 32 in Fig. 1. An annular ridge 121 is provided adjacent the shoulder 33a and may be crimped inwardly to secure the wall 120 in place.

The location of the wall 120 in spaced relation from the flange 112 and the annulus 45d provides additional space over that provided in Fig. 1, in which space the gear 125 driven by pinion 17 can rotate. This gear 125 by its position above the annulus 45d is not a limitation on the inside dimensions of the annulus or the adapter bowl 40d as in the case when the gear rotates within the adapter bowl.

The drive shaft extension 105 enables pinion 17 and the gear 125 to be raised into the space inside the meter head 30a discussed above. The size of the shaft portion of this extension 105 is preferably the same as the size of the meter drive shaft 16 so that the same pinion and gears provided in the meter may be used.

It will be noted in Fig. 10 that no packing means is used around the meter drive shaft 16 such as that provided in the other embodiments discussed. Thus the chamber provided between the adapter and the meter head cover 120 will be filled with water under the same pressure as that within the meter body, and the meter head will operate under such pressure. The seals 73, 108 and 116 insure that no water pressure will build up within the upper bowl 11.

An important advantage of the adapters of Figs. 5, 6, 7, 8, 9, 10 and 11 is that their use keeps to a minimum the force acting to separate the adapter body from the meter body. It will be observed that the force acting to separate the adapter body from the meter body in the embodiment shown in Figs. 1–4 is equal to the pressure, built up within the upper bowl 11 by the leakage water, times the area of the mouth of the meter head 30. As has been pointed out this force is counteracted by the additional securing means provided by mmebers 41a and 70. However, within the sealed chambers provided by the adapter bowls of Figs. 5, 6, 7, 8 and 9 there are two forces acting in opposite directions. One force acts upwardly against the meter head and is equal to the pressure times the area of the meter head exposed to the pressure. The second force acts downwardly against the adapter body and is equal to the downward component of the pressure times the area of the adapter bowl against which it acts. Since these two forces act in opposite directions, it is only the difference between them which acts to separate the adapter body from the meter body. This is substantially the unit pressure times the area of the opening in the bottom of the adapter bowl.

This feature is important because with it the adapter annulus may be easily held to the meter body by the capscrews 51 engaging the two threaded bores, provided in most conventional meters, and by the additional securing means provided. Since the adapter annulus is provided with means for securing the adapter body to the meter head, e. g., the capscrews 64, which means may be as strong and as numerous as is necessary, the matter of holding the adapter body and meter head against forces tending to separate them presents no problem.

From the foregoing it will be seen that this invention is one well adapted to attain all of the ends and objects hereinabove set forth, together with other advantages which are obvious and which are inherent to the apparatus.

It will be understood that certain features and subcombination are of utility and may be employed without reference to other features and subcombinations. This is contemplated by and is within the scope of the claims.

As many possible embodiments may be made of the invention without departing from the scope thereof, it is to be understood that all matters herein set forth or shown in the accompanying drawings is to be interpreted as illustrative and not in a limiting sense.

The invention having been described, what is claimed is:

1. For use with a conventional water meter of a type wherein the body of said meter is normally subject to fluid pressure but the upper bowl of the meter is not normally subject to fluid pressure, the meter also having a drive shaft extending from within its body into the upper bowl and a nut connected to the body and surrounding said drive shaft, a conversion unit comprising: a universal meter head capable of operating while containing fluid under pressure comparable to that within the meter body, an adapter body including a bowl with an opening in the bottom thereof through which said shaft extends, the area of said adapter bowl adjacent the opening cooperating with said nut for anchoring the adapter bowl to the meter body, an annulus extending outwardly from and fixed with respect to the adapter bowl, said annulus having one face formed to mate with the meter head and an opposed face formed to mate with the upper bowl, and means including the adapter body holding the meter head to the meter body against fluid pressure.

2. A device as set forth in claim 1, said adapter bowl and said meter head defining a chamber therebetween and means providing a hermetical seal between said chamber and the upper bowl of the meter.

3. For use in converting a meter having a conventional head to receive a universal meter head, wherein said meter has a body, an upper bowl, a threaded projection extending from the body into the upper bowl, a meter drive shaft passing through said projection, and a nut engaging said projection and surrounding said drive shaft, apparatus comprising: an adapter body including a bowl having an opening therein for surrounding said projection, said nut engaging the area of said bowl adjacent the opening and anchoring the adapter bowl to the meter body, and an annulus extending outwardly from and fixed with respect to the adapter bowl, said annulus having one face formed to mate with the meter head, and means securing the adapter body to the meter head.

4. A device as set forth in claim 3, said adapter bowl and said meter head forming a chamber and means providing a hermetical seal between said chamber and the upper bowl of the meter.

5. For use in connecting a meter head containing a gear system to a meter body wherein the body has an opening with a gear system drive shaft extending therethrough, apparatus comprising an adapter bowl having an opening therein for surrounding said drive shaft opening and also having an annular portion extending outwardly from said opening and mating with said meter head adjacent the periphery thereof, first seal means sealing said meter head and adapter bowl together at said annular portion so that the meter head and adapter bowl together define an enclosed chamber at least a portion of which is within the adapter bowl and in fluid communication with said body opening, second seal means disposed around and adjacent to said adapter bowl opening and forming a seal between said adapter bowl and said body around said body opening and preventing flow from the body opening to the exterior of the adapter bowl, and means securing the meter head and adapter bowl together and to said body, the cross-sectional area within said second seal means being substantially smaller than the cross-sectional area within said first seal means whereby the force tending to separate the meter head and adapter bowl from the body is not substantially more than the unit pressure in said chamber times the first mentioned cross-sectional area.

6. In combination with a meter body having a boss extending therefrom with an opening through the boss through which a register drive shaft extends, an adapter having a central opening therein through which said boss extends and also having an annular portion extending outwardly from said adapter opening, a meter head mounted on said adapter and sealed to said annular portion, seal means between the adapter and body and adjacently surrounding said boss and preventing flow from the boss opening to the exterior of the adapter, means securing the adapter to said boss and the meter head to said bowl, the cross-sectional area within said sealing means being substantially less than the cross-sectional area within the seal between the annular portion and said meter head whereby the only force effective to urge the meter head and adapter from the meter body is the unit pressure within the adapter times the first mentioned cross-sectional area.

7. The combination of claim 6 wherein said securing means comprises a nut on said boss engaging the adapter adjacent the adapter opening and anchoring the adapter to the meter body, and fastening means holding the meter head and adapter together.

References Cited in the file of this patent

UNITED STATES PATENTS

| | | |
|---|---|---|
| 675,145 | Tilden | May 28, 1901 |
| 1,034,479 | McCourt | Aug. 6, 1912 |
| 1,460,471 | Bassett | July 3, 1923 |
| 2,246,250 | Hanks | June 17, 1941 |

FOREIGN PATENTS

| | | |
|---|---|---|
| 19804/34 | Australia | Oct. 18, 1934 |